United States Patent
Osaka et al.

(10) Patent No.: US 8,484,598 B2
(45) Date of Patent: Jul. 9, 2013

(54) NOISE ANALYSIS DESIGNING METHOD

(75) Inventors: Hideki Osaka, Oiso (JP); Takashi Suga, Yokohama (JP); Makoto Torigoe, Ayase (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/145,694

(22) PCT Filed: Nov. 13, 2009

(86) PCT No.: PCT/JP2009/069329
§ 371 (c)(1),
(2), (4) Date: Sep. 13, 2011

(87) PCT Pub. No.: WO2010/097991
PCT Pub. Date: Sep. 2, 2010

(65) Prior Publication Data
US 2011/0320995 A1 Dec. 29, 2011

(30) Foreign Application Priority Data
Feb. 24, 2009 (JP) .................................. 2009-041003

(51) Int. Cl.
*G06F 17/50* (2006.01)
(52) U.S. Cl.
USPC ....................................................... 716/115
(58) Field of Classification Search
USPC ....................................................... 716/115
See application file for complete search history.

(56) References Cited

U.S. PATENT DOCUMENTS

| | | | |
|---|---|---|---|
| 6,557,154 B1 * | 4/2003 | Harada et al. ................. | 716/115 |
| 6,871,334 B2 * | 3/2005 | Mabuchi et al. ............. | 716/115 |
| 7,197,446 B2 * | 3/2007 | Breiland et al. ............... | 703/14 |
| 2001/0018761 A1 * | 8/2001 | Sasaki et al. .................... | 716/15 |
| 2002/0065643 A1 * | 5/2002 | Hirano et al. .................. | 703/19 |
| 2005/0197817 A1 * | 9/2005 | Iwaki et al. .................... | 703/14 |
| 2006/0173662 A1 | 8/2006 | Kazama et al. | |
| 2009/0102470 A1 * | 4/2009 | Kiso ............................ | 324/227 |
| 2010/0138800 A1 * | 6/2010 | Kobayashi ....................... | 716/5 |
| 2010/0312539 A1 * | 12/2010 | Yamagajo et al. ............. | 703/14 |

FOREIGN PATENT DOCUMENTS

| | | |
|---|---|---|
| JP | 6-83900 A | 3/1994 |
| JP | 9-245076 A | 9/1997 |
| JP | 2006-209590 A | 8/2006 |
| JP | 2007-140839 A | 6/2007 |
| JP | 2008-152711 A | 7/2008 |

OTHER PUBLICATIONS

Japanese Office Action dated Jul. 31, 2012 (three (3) pages).
International Search Report including English translation dated Dec. 15, 2009 (Four (4) pages).

* cited by examiner

*Primary Examiner* — Jack Chiang
*Assistant Examiner* — Magid Dimyan
(74) *Attorney, Agent, or Firm* — Crowell & Moring LLP

(57) ABSTRACT

To provide a simulation technology of ending multiphysics analysis on heat, vibration, and EMC within a practical time and with a low-price computation process at an early stage of product designing, in a noise analysis designing method for an electric device, such as an inverter for automobile, this electric device includes one or more energy sources, a propagation path through which energy from the energy source propagates, and a noise occurring part where an electromagnetic radiated noise occurs due to the energy coming from the propagation path, the method has a step of estimating the occurring noise, such as a occurring radiated noise, by analyzing a path specified by a user by using a calculator, and the path specified by the user is a path of the energy flowing through the propagation path.

2 Claims, 9 Drawing Sheets

FIG. 7

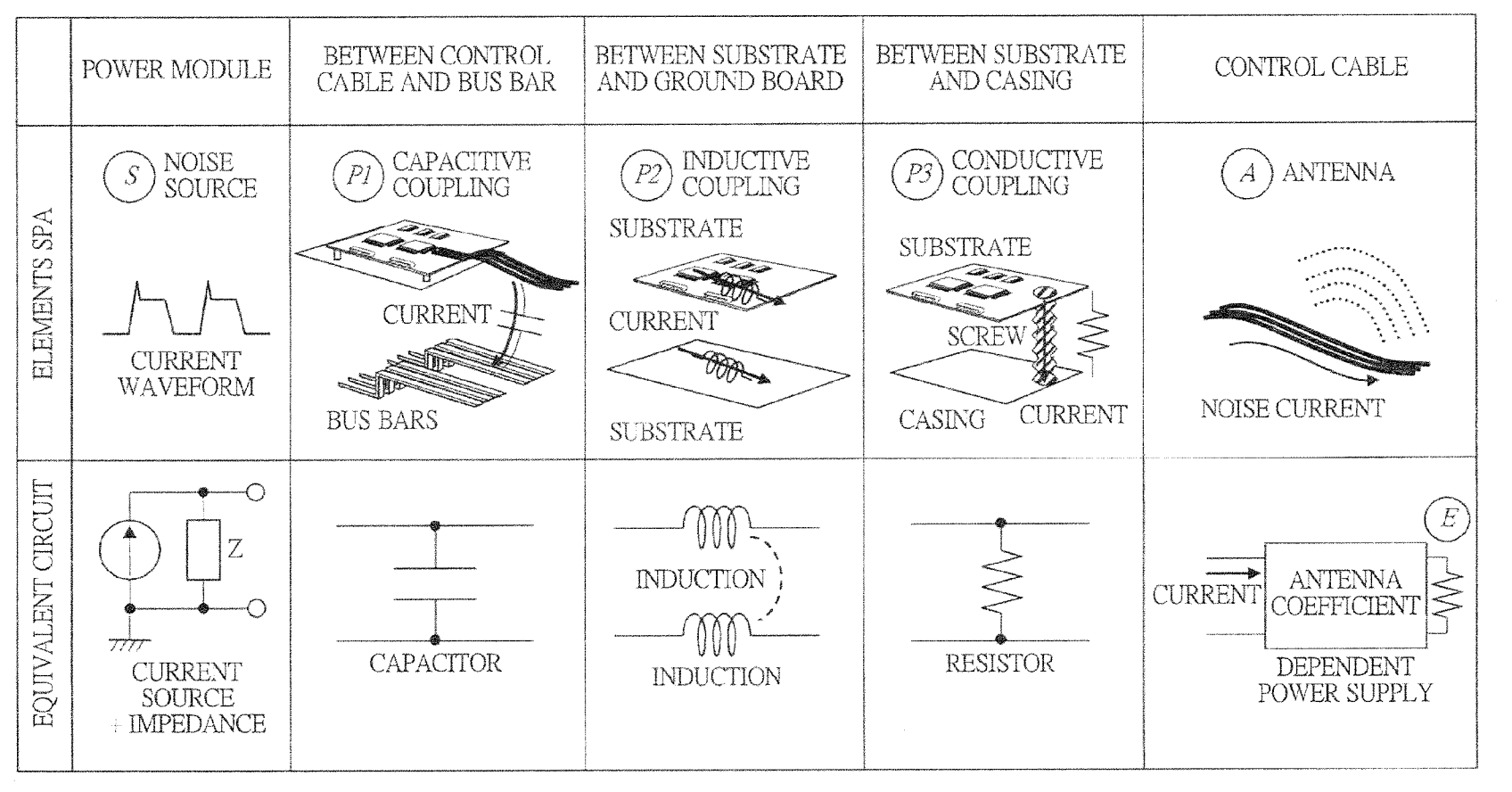

| | POWER MODULE | BETWEEN CONTROL CABLE AND BUS BAR | BETWEEN SUBSTRATE AND GROUND BOARD | BETWEEN SUBSTRATE AND CASING | CONTROL CABLE |
|---|---|---|---|---|---|
| ELEMENTS SPA | (S) NOISE SOURCE / CURRENT WAVEFORM | (P1) CAPACITIVE COUPLING / CURRENT / BUS BARS | (P2) INDUCTIVE COUPLING / SUBSTRATE / CURRENT / SUBSTRATE | (P3) CONDUCTIVE COUPLING / SUBSTRATE / SCREW / CASING / CURRENT | (A) ANTENNA / NOISE CURRENT |
| EQUIVALENT CIRCUIT | CURRENT SOURCE + IMPEDANCE (Z) | CAPACITOR | INDUCTION / INDUCTION | RESISTOR | ANTENNA COEFFICIENT DEPENDENT POWER SUPPLY / CURRENT |

NOISE ANALYSIS DESIGNING METHOD

TECHNICAL FIELD

The present invention relates to noise analysis designing technology for electric devices and, in particular, to technology effectively applied to an EMC (Electro Magnetic Compatibility: electromagnetic field) analysis designing method such as inverters for automobile.

BACKGROUND ART

According to studies by the inventors, examples of noise analysis designing technologies for electric devices include those described in Patent Documents 1 and 2.

Patent Document 1 describes a technology for an electromagnetic-field analyzing apparatus with a significantly reduced amount of memory used by a computer and simulation computing time, in which an error between a result of computation of electromagnetic compatibility by a simulation and an actual result of computation of electromagnetic compatibility is minimized.

Patent Document 2 describes a patchboard designing apparatus accurately performing various simulations regarding waveforms, heat, timing, electromagnetic radiation, and others in designing a print patchboard and a multi-chip module substrate.

RELATED ART DOCUMENTS

Patent Documents

Patent Document 1: Japanese Patent Application Laid-Open Publication No. 2006-209590
Patent Document 2: Japanese Patent Application Publication Laid-Open Publication No. 9-245076

DISCLOSURE OF THE INVENTION

Problems to be Solved by the Invention

Meanwhile, as a result of the studies by the inventors regarding the noise analysis designing technologies for electric devices as described above, the following has been revealed. For example, in the above-described Patent Document 1, only the return current of via holes (holes passing through and connecting layers of a multilayer printed board) is taken into consideration for model simplification; no description is made about what lies between substrates and between a substrate and a cable, and a part with a high degree of contribution (major path or main path) is not extracted. Moreover, the above-described Patent Document 2 does not describe a speedup of EMC simulation.

Furthermore, in the noise analysis designing technologies for electric devices in the conventional art, when an inverter for automobile designed as being of a 100 kW class finds an EMC design by electromagnetic field analysis, in order to suppress a leakage of electric power equal to or lower than a small allowable leakage of electric power of 1 nW, suppression is required by an amount equal to or lower than a value obtained by multiplying the electric power by the ratio between these two values, that is, $10^{-14}$, and analytical accuracy is required accordingly. Thus, despite a large calculator cost, computation never ends within a practical time.

Thus, a preferred aim of the present invention is to provide a simulation technology of ending multiphysics analysis on heat, vibration, and EMC within a practical time and with a low-price computation process at an early stage of product designing.

The above and other preferred aims and novel characteristics of the present invention will be apparent from the description of the present specification and the accompanying drawings.

Means for Solving the Problems

The typical ones of the inventions disclosed in the present application will be briefly described as follows.

A noise analysis designing method for an electric device, the electric device including one or more energy sources, a propagation path through which energy from the energy source propagates, and a noise occurring part where noise occurs due to the energy transferred from the propagation path, the method comprising a step of estimating occurring noise by analyzing a path specified by a user by using a calculator, and the path specified by the user being a path of the energy flowing through the propagation path.

Effects of the Invention

The effects obtained by typical aspects of the present invention will be briefly described below.

That is, an effect that can be typically obtained is to provide a simulation technology of ending multiphysics analysis on heat, vibration, and EMC within a practical time and with a low-price computation process at an early stage of product designing.

BRIEF DESCRIPTIONS OF THE DRAWINGS

FIG. 7 is a diagram for describing an equivalent model for each element in the embodiment of the present invention;

BEST MODE FOR CARRYING OUT THE INVENTION

<General Outlines of the Embodiment>

General outlines of noise analysis designing technologies for electric devices according to an embodiment of the present invention will be described. In the present embodiment, circuit analysis is used to achieve an EMC high-speed analyzing technology.

Since EMC is originally a matter of an electromagnetic phenomenon, electromagnetic field analysis is resolved normally; however, in the present embodiment, the idea is changed by achieving a high speed by performing an analysis with an electric circuit. This can be possible on the premise that the noise mechanism of a product is known and a noise propagation path including parasitic components is known. With this, an equivalent circuit can be developed in EMC circuit analysis.

The concept of this EMC circuit analysis is based on E=SPA as a basic equation, that is, a concept in which emission (E) indicating radiant intensity can be represented by the product of a source (S) indicating a noise source, a propagation path (P), and an antenna (A). As for an inverter for automobile, a mechanism that which part forming the inverter corresponds to which part of this E=SPA is clarified. Then, by creating an equivalent circuit corresponding to this mechanism and performing a circuit analysis, an electric field intensity of EMC can be computed.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Flow of EMC Designing Method and Structure of EMC Designing Apparatus>

Figure 1:
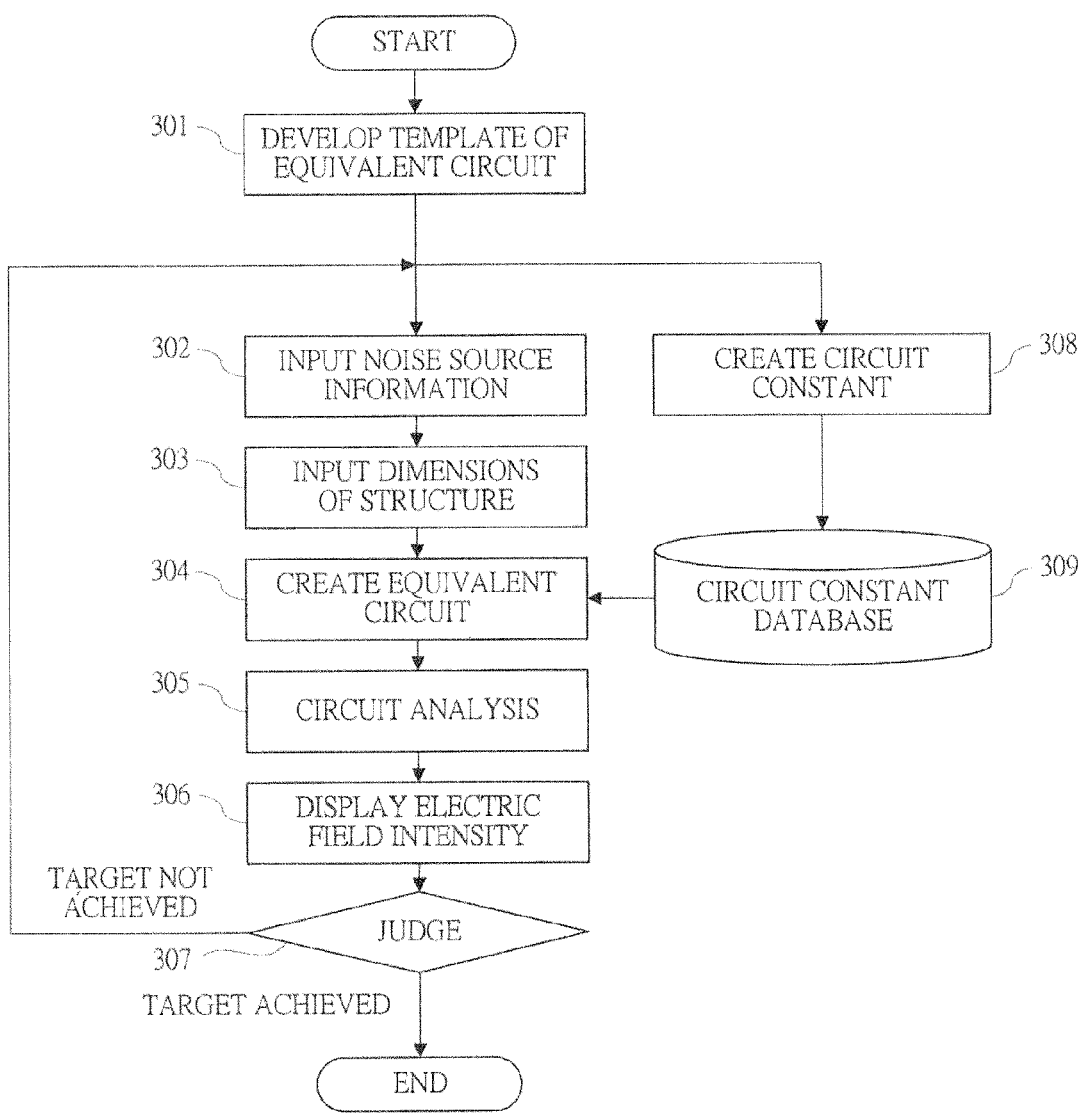
FIG. 1 is a diagram for describing a flow of an EMC designing method and a structure of an EMC designing apparatus according to an embodiment of the present invention.

FIG. 1 is a diagram for describing a flow of an EMC designing method and a structure of an EMC designing apparatus according to the embodiment of the present invention.

In the EMC designing method of the present embodiment, prior to circuit analysis, a template of equivalent circuit is developed (step 301), a circuit constant is created (step 308), and a circuit constant database is created (step 309). In this manner, the circuit constant database is prepared in advance prior to circuit analysis.

After this circuit constant database is prepared, noise source information and dimensions of the structure are first input by a user (steps 302 and 303). Based on these pieces of input information and the information of the circuit constant database created in advance, an equivalent circuit is created (step 304), and a circuit analysis is performed (step 305). Then, an electric field intensity is displayed (step 306), and the result of circuit analysis is judged (step 307); when the target is not achieved as a result of this judgment, the procedure returns to step 302 to repeat the processes from step 302 to step 306. Then, when it is judged at step 307 that the target is achieved, EMC designing ends. Here, by displaying the result of circuit analysis (step 305) correspondingly to a circuit diagram prior to or simultaneously with displaying electric field intensity (step 306), a part where the target is not achieved may be clearly demonstrated. In this case, the user can easily estimate to which part in the circuit diagram, that is, in the structure, the part where the target is not achieved corresponds.

The EMC designing method as described above can be achieved by using a calculator configured of a central processing unit, a storage device, and others. That is, in the EMC designing apparatus of the present embodiment, by using a calculator to execute a program written with an algorithm of the EMC designing method stored in a storage device on a central processing unit, functional portions are constructed, such as a functional portion for developing a template of equivalent circuit, a functional portion for creating a circuit constant, a functional portion for inputting noise source information, a functional portion for inputting dimensions of the structure, a functional portion for creating an equivalent circuit, a functional portion for circuit analysis, a functional portion for judging the result of circuit analysis, and a functional portion for displaying an electric field intensity. Also, in the EMC designing apparatus, a circuit constant database is constructed on the storage device.

<Detailed Flow of Developing Template of Equivalent Circuit>

Figure 2:
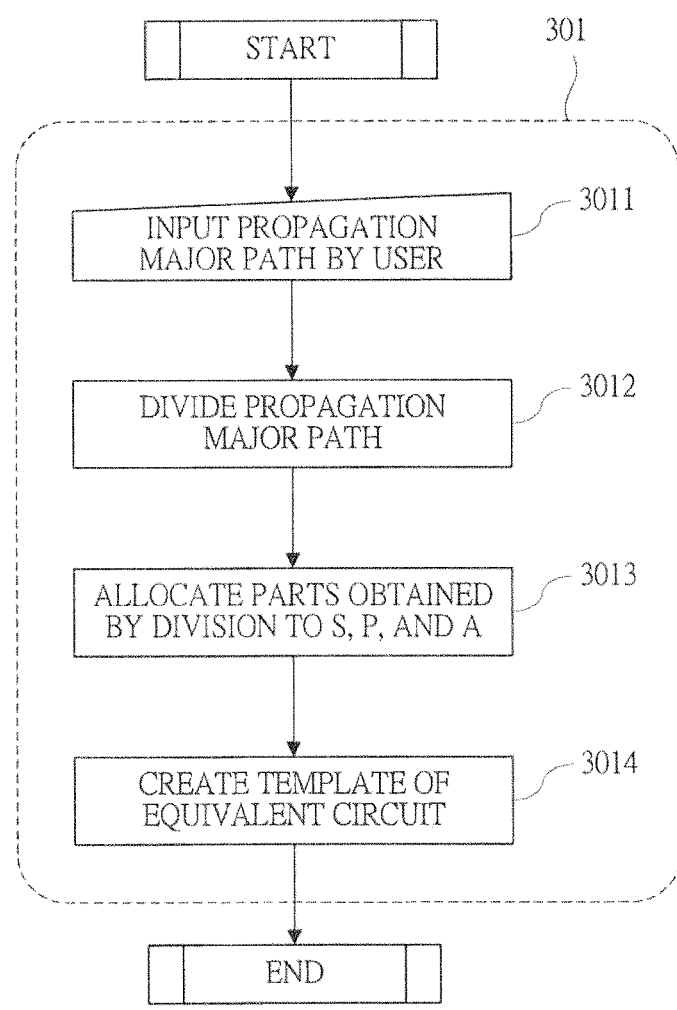
FIG. 2 is a diagram for describing a detailed flow of developing a template of equivalent circuit in the embodiment of the present invention.

FIG. 2 is a diagram for describing a detailed flow of developing a template of equivalent circuit in the present embodiment.

In developing a template of equivalent circuit at step 301 depicted in FIG. 1, a major path of propagation is input by a user (step 3011). In this case, the user extracts a major path of propagation of electric energy and defines this major path of propagation. For example, in the case of an inverter for automobile, which will be described further below, a propagation path through which energy from an energy source is propagated and a path having a noise occurring part where electromagnetic radiation noise occurs due to the energy coming from this propagation path and having energy flowing through the propagation path; and a path of energy flowing in the propagation path is defined as a major path of propagation.

Based on this defined major path of propagation, the major path of propagation is divided (step 3012), and parts obtained by division are allocated to S (noise source), P (path), and A (antenna) (step 3013). That is, E (radiation electric field) by circuit analysis, each part of a product is classified into E=SPA. Then, a template of equivalent circuit is created according to the classification of E=SPA (step 3014).

A template of equivalent circuit is developed in the manner as described above. Then, a circuit constant is created at step 308 described above, and then, at step 309 described above, a circuit constant database is created depending on the input shape. Furthermore, in circuit analysis at step 305 described above, a radiation electric field is computed in accordance with the input shape.

<Design Flow by Multiphysics Analysis>

Figure 3:
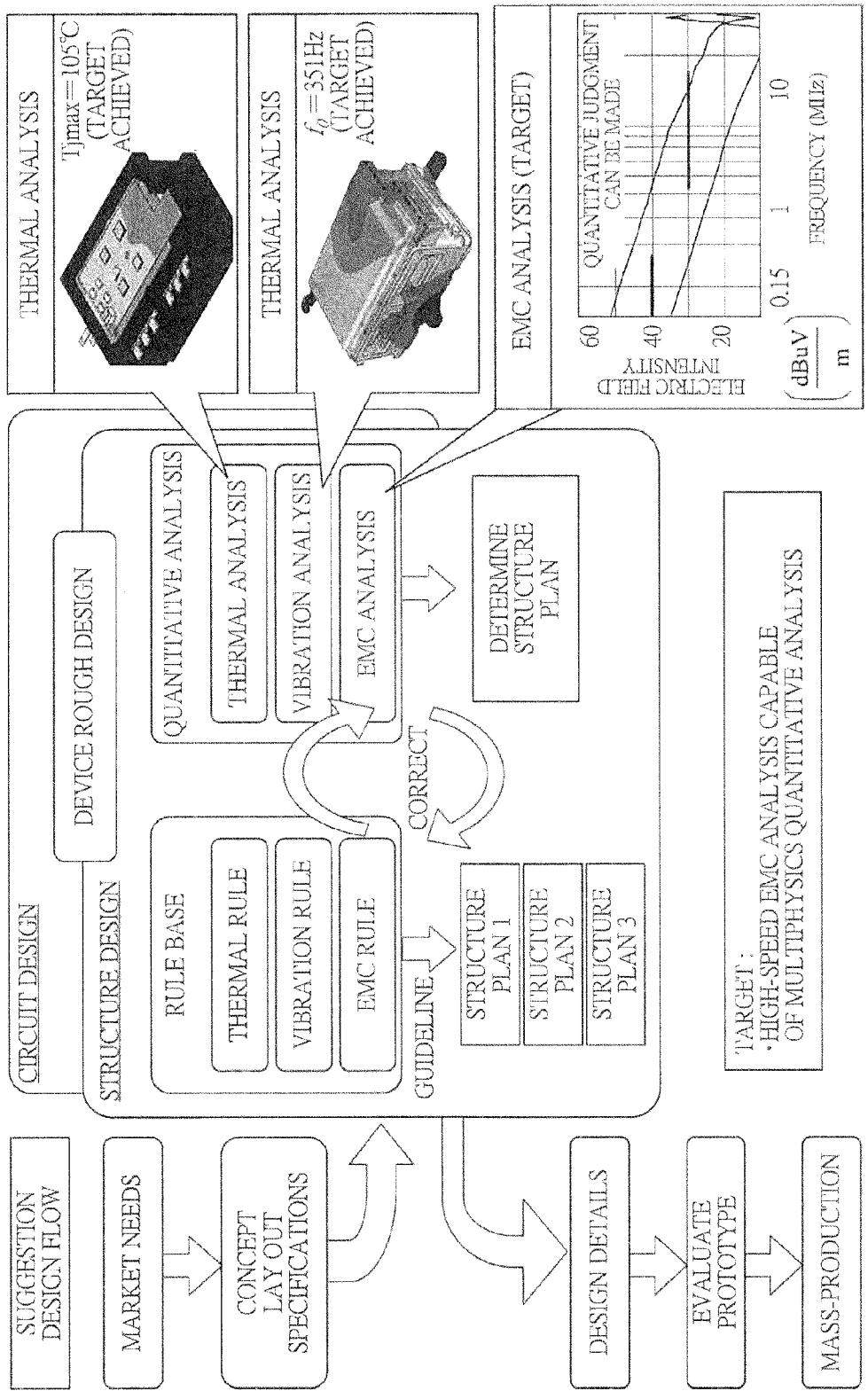
FIG. 3 is a diagram for describing a design flow by multiphysics analysis in the embodiment of the present invention.

FIG. 3 is a diagram for describing a design flow by multiphysics analysis in the present embodiment.

In a design flow by multiphysics analysis, concept specifications are laid out based on the market needs to make a device rough design. As for an inverter, the circuit and structure are designed based on the concept specifications, and a rough structure of each component is determined so as to avoid reversion in view of heat, vibration, and EMC. Then, a flow of detail designing, prototype evaluation, and then mass production is performed in this order for shipping of a product.

In a device rough design stage, which is an early stage of design, a plurality of structure plans according to each of a thermal rule, a vibration rule, and an EMC rule are extracted. In this rule-based designing, schematic designing can be performed based on past accumulation of design. These plurality of structure plans are separately subjected to quantitative analysis, thereby obtaining whether the structure plan can achieve each target.

For example, although it is difficult even in the existing technologies to fully resolve thermal analysis and vibration analysis, by partially modeling the energy propagation major path at an early stage of design, a practical value can be computed within a practical time.

However, in EMC analysis of the existing technologies, quantitative analysis cannot be made, and therefore one cannot be selected from a plurality of structure plans for narrowing down. That is, in EMC analysis, electric power on an extremely large order of magnitude from 100 kW to 1 nW has to be handled. Also, for leakage path computation on a 1 nW order, handling of parasitic components in electrostatic coupling or induction coupling is required, thereby requiring analysis on the entire space. Therefore, enormous mesh analysis is required, causing a difficulty in which EMC analysis cannot be performed within a practical time.

To get around this, in the design flow of the present embodiment, EMC analysis can be quantitatively judged at high speed from the plurality of structure plans obtained from the rule-based design, thereby allowing determination of a structure plan satisfying EMC design together with thermal design and vibration design. That is, a target in the design flow of the present embodiment is to achieve EMC high-speed analysis allowing multiphysics quantitative analysis.

In the design flow by multiphysics analysis described above, the EMC analysis part in the structure plan with the EMC rule taken as a guideline corresponds to the flow of the EMC designing method described and depicted in FIGS. 1 and 2.

<Structure of Inverter>

Figure 4:
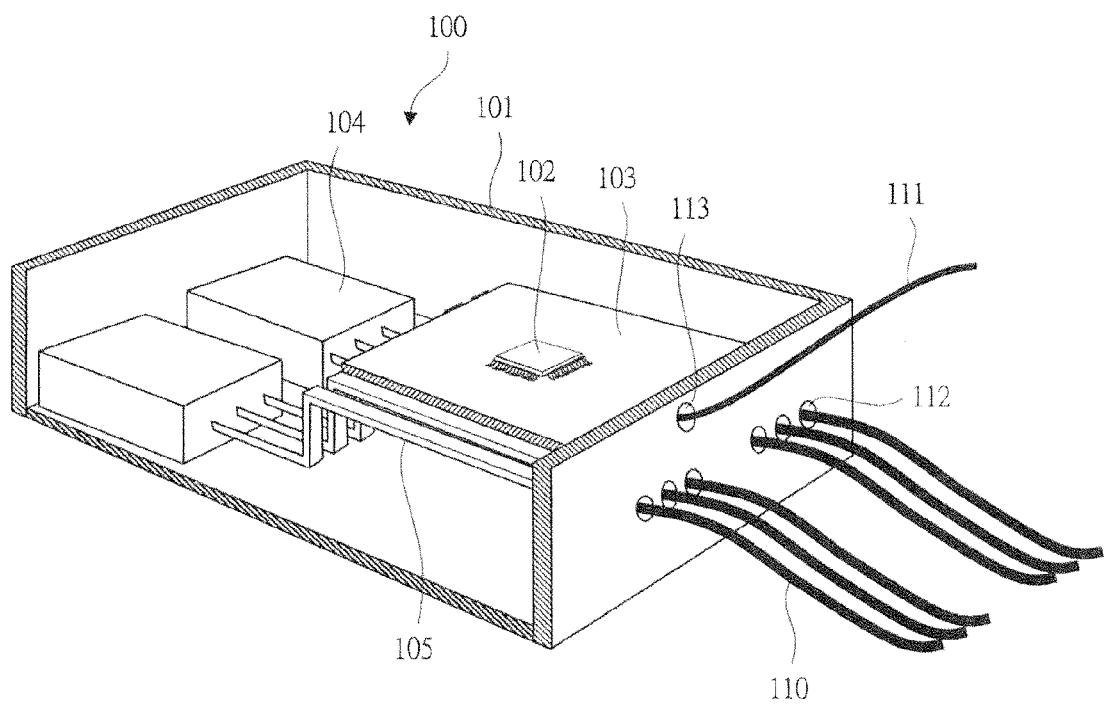
FIG. 4 is a diagram for describing a structure of an inverter in the embodiment of the present invention.

FIG. 4 is a diagram for describing the structure of an inverter in the present embodiment.

An inverter 100 is accommodated in a casing 101, and is formed of an LSI 102 having a control circuit formed thereon, a substrate 103 having this LSI 102 mounted thereon, two power modules 104, bus bars 105 connected to the power modules 104, motor cables 110 connected to these bus bars 105, and a control cable 111 connected to the substrate 103 having the LSI 102 mounted thereon, etc. The motor cables 110 and the control cable 111 are each drawn to outside via openings 112 and 113 formed on a side surface of the casing 101. Note that, although not shown, a ground board is disposed on a rear surface of the substrate 103.

In this inverter 100, the power modules 104 function as one or more energy sources, the bus bars 105 and the control cable 111 each function as a propagation path through which energy from the energy sources is propagated, and the control cable 111 functions as a noise occurring part where an electromagnetic noise occurs due to the energy coming from the propagation path. In this inverter 100 as described above, a path of energy flowing through the propagation path is specified by a user, and the path specified by the user is analyzed to estimate occurring radiated noise.

<EMC designing of Inverter for Automobile>

Figure 5:
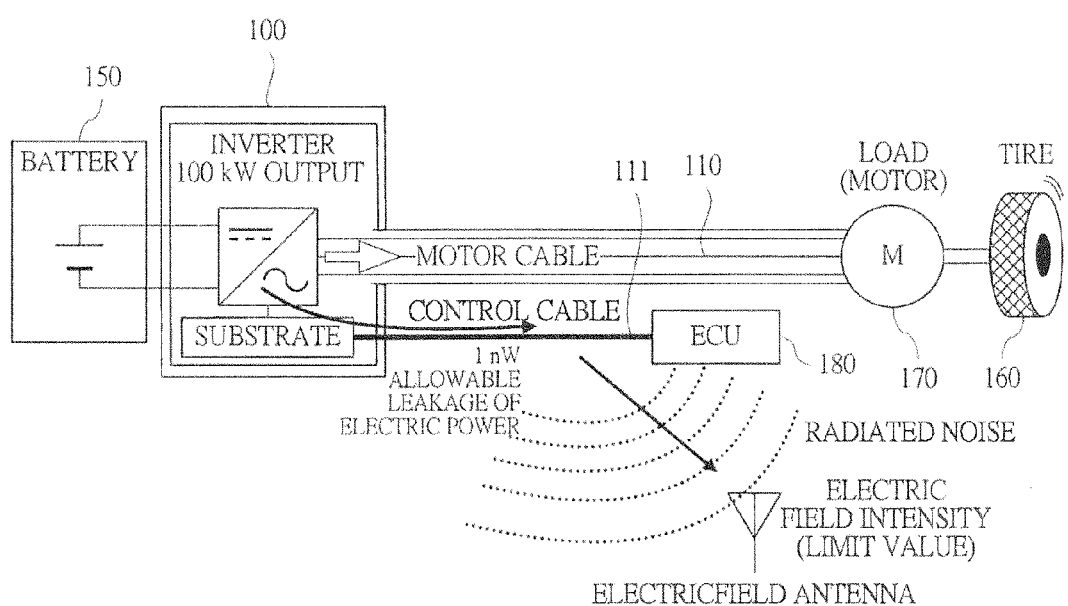
FIG. 5 is a diagram for describing EMC designing for an inverter for automobile in the embodiment of the present invention.

FIG. 5 is a diagram for describing EMC designing for an inverter for automobile in the present embodiment.

The inverter for automobile is formed of the inverter 100 as depicted in FIG. 4 described above, and a battery 150 is connected to this inverter 100. Also, in the inverter 100, the motor cables 110 drawn from this inverter 100 are connected to a motor 170 driving a tire 160, and the control cable 111 is connected to an ECU (Engine Control Unit) 180.

In the case of an automobile, the inverter 100 that converts a direct current from the battery 150 to an alternating current in order to drive the tire 160 with the motor 170. Here, control signals for accelerating or decelerating the automobile or other purposes are transferred from the ECU 180 via the control cable 111 to the inverter 100 and, accordingly, the inverter 100 performs torque control by pulse modulation.

When this inverter 100 performs pulse modulation, a noise occurs, which partially leaks to the outside to cause noise radiation therefrom. To prevent the electric field intensity at an electric field antenna from exceeding a limit value, an allowable leakage of electric power is equal to 1 nW. On the other hand, the inverter 100 has a maximum output of a 100 kW class. To suppress the output voltage equal to or lower than this allowable leakage of electric power, suppression is required by a power suppression amount equal to or lower than a value obtained by multiplying the electric power by the ratio between these two values, that is, by a factor of $10^{-14}$. That is, EMC designing in which a leakage to outside of the device of the inverter 100 is suppressed to cause the radiated noise to be equal to or lower than the limit value has a difficulty in which the leakage of electric power has to be suppressed to be equal to or lower than fourteen orders of magnitude.

For this reason, in the conventional technology, as described above, computation never ends within a practical time even with large calculator cost in this EMC designing. In the present embodiment, by applying the EMC designing method depicted in FIGS. 1 and 2 as described above, the computing process can end within the practical time and at a low price.

<Cross Section of Inverter>

Figure 6:
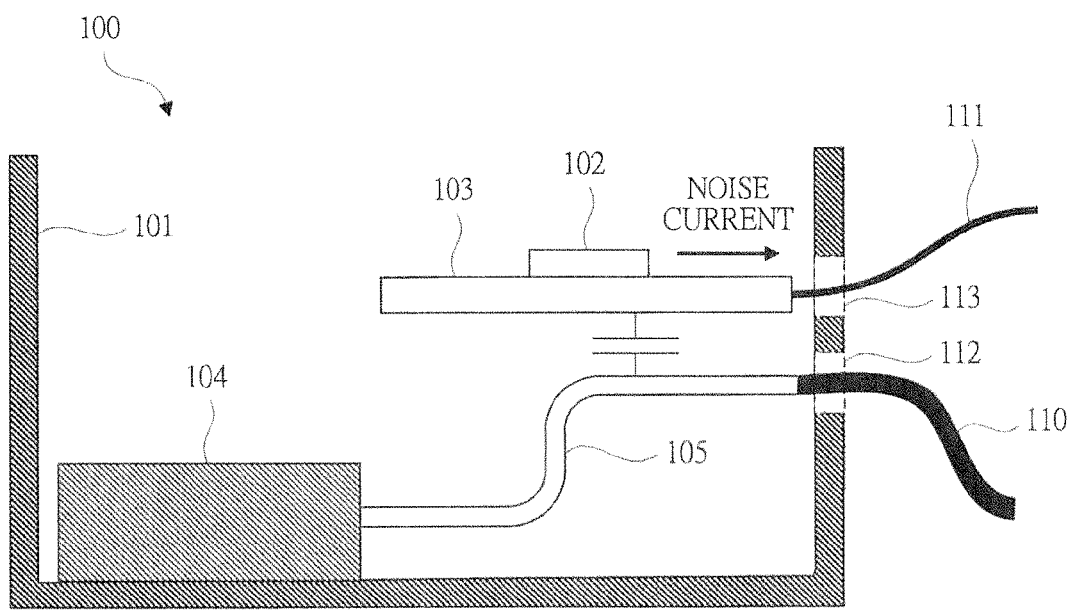
FIG. 6 is a diagram for describing a cross section of the inverter in the embodiment of the present invention.

FIG. 6 is a diagram for describing a cross section of the inverter in the present embodiment.

The cross section of the inverter 100 described and depicted in FIG. 4 is as shown in FIG. 6. As depicted in FIG. 6, capacitive coupling occurs between the substrate 103 having the LSI 102 mounted thereon and the bus bars 105 connected to the power module 104. Furthermore, inductive coupling occurs between the substrate 103 and the ground board, and conductive coupling occurs between the substrate 103 and the casing 101.

In the inverter 100 having the above-described cross-sectional structure, a method as described below can be taken as a method of identifying a noise propagation path. For example, in current analysis on the substrate 103, by scanning a part directly above the substrate 103 with the use of a magnetic field sensor, a distribution of noise currents flowing the substrate 103 can be measured. Also, a current flowing between components, such as the substrate 103 and the casing 101, can be measured by using a screw current probe. In this measuring technique, a coil-shaped wiring is created on a micro-substrate so as to surround a screw connecting the substrate 103 and the casing 101, and a current flowing through the screw is measured. Furthermore, also by means of a technique of measuring a current distribution with a high-sensitivity magnetic field sensor on the surface of the casing 101, a standing wave of 3 GHz can be measured.

By these measuring techniques, a propagation path of a noise current unique to the product largely depending on a mount state can be identified. Next, for this identified propagation path of the noise current, an equivalent circuit is developed by combining equivalent models for the respective elements, which will be described below.

<Equivalent Model for Each Element>

FIG. 7 is a diagram for describing an equivalent model for each element in the present embodiment.

To develop an equivalent circuit for the propagation path of the noise current, for each part of the parasitic components or noise path identified as depicted in FIG. 6, an equivalent circuit is developed as depicted in FIG. 7. For example, for the power module 104, an equivalent representation is made with a current source having impedance as an element S (noise source). Also, between the control cable 111 and the bus bars 105 for propagation of large electric power, an equivalent representation is made with a capacitor as an element P1 (capacitive coupling by current). Furthermore, between the substrate 103 and the ground board, an equivalent representation is made with an inductor as an element P2 (inductive coupling by current). Still further, for the screw between the substrate 103 and the casing 101, an equivalent representation is made with a resistor as an element P3 (conductive coupling by the current flowing through the screw). For the control cable 111, a representation of antenna efficiency indicating of radiation efficiency of an antenna is made with a dependent power supply as an element A (antenna by noise current).

With the above, an equivalent circuit can be developed for each noise path and part. Next, by combining the equivalent circuits for the respective elements, one template of equivalent circuit can be obtained as will be described further below.

<Template of Equivalent Circuit of Inverter>

Figure 8:
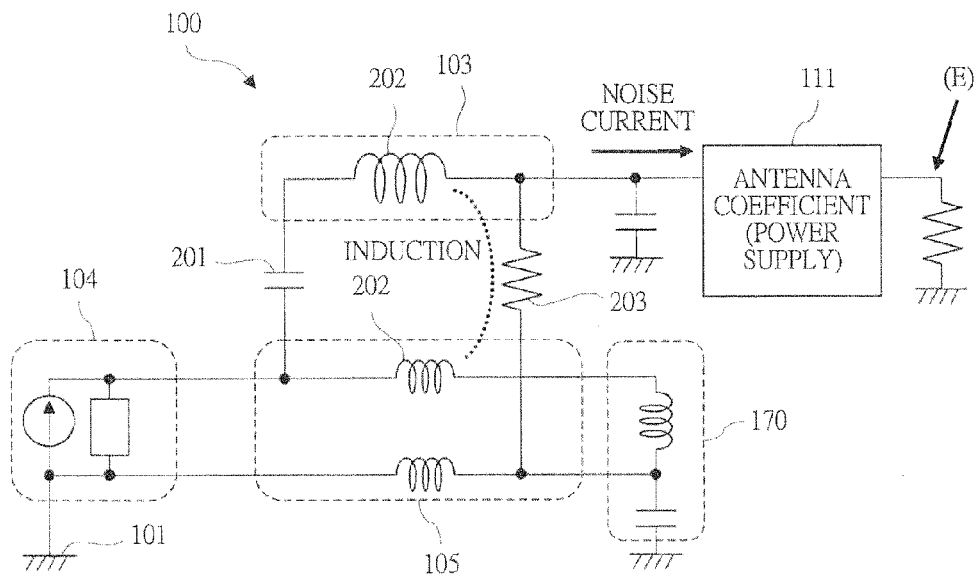
FIG. 8 is a diagram for describing a template of equivalent circuit for the inverter in the embodiment of the present invention.

FIG. 8 is a diagram for describing a template of equivalent circuit for the inverter in the present embodiment.

By combining the equivalent circuits for the respective elements described and depicted in FIG. 7, one template of equivalent circuit can be obtained as depicted in FIG. 8. For example, the power module 104 part can be represented as a current source having impedance. The bus bar 105 part can be represented as an inductor. The motor 170 part can be represented as an inductor and a capacitor. The control cable 111 can be represented as a spatial impedance of an antenna coefficient (power source) and a radiation electric field (E). Still further, between the control cable 111 and the bus bars 105, a representation can be made with a capacitor 201 by capacitive coupling. Between the substrate 103 and the ground board, a representation can be made with an inductor 202 by inductive coupling. Between the substrate 103 and the casing 101, a representation can be made with a resistor 203 by conductive coupling. Although electric power is supplied with three-phase AC from the inverter 100 to the motor in practice, the template of equivalent circuit may be written with a circuit network indicating three-phase AC.

In this manner, the EMC mechanism of the inverter 100 can be represented with a template of equivalent circuit. Next, for this obtained template of equivalent circuit, a circuit constant database is created, which will be described below.

<Creation of Circuit Constant Database>

Figure 9:
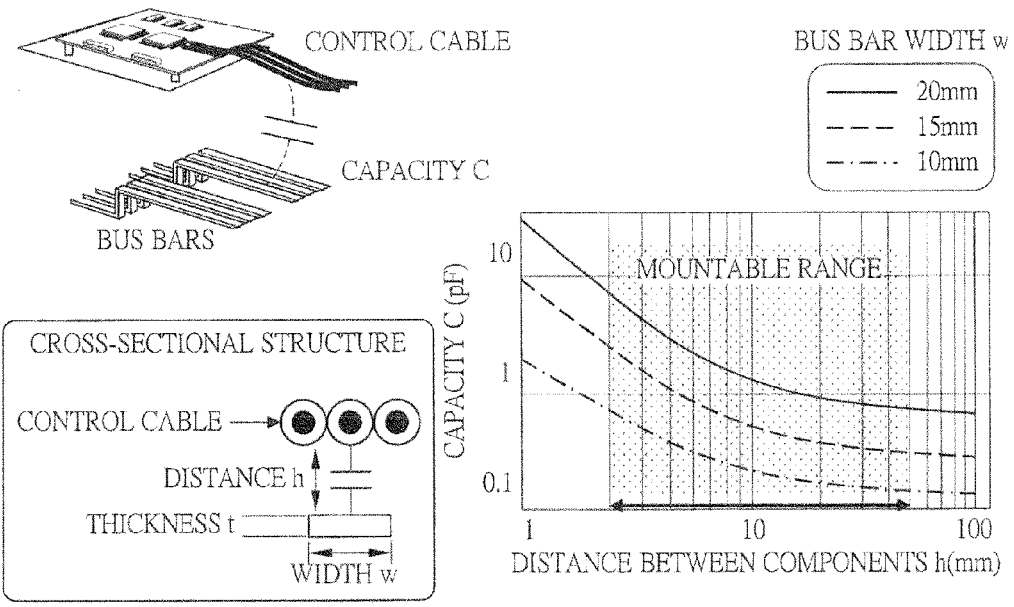
FIG. 9 is a diagram for describing creation of a circuit constant database in the embodiment of the present invention.

FIG. 9 is a diagram for describing creation of a circuit constant database in the present embodiment.

In creating a circuit constant database for the template of equivalent circuit, a constant of this equivalent circuit varies depending on the position of each component and dimensions between components. Thus, for example, as depicted in FIG. 9, when a parasitic capacity C between the control cable 111 and the bus bars 105 is calculated, a mountable range represented by a distance h between the control cable 111 and the bus bars 105, a width w of each bus bar 105, and others is first found in the cross-sectional structure. Within this mountable range, a constant is calculated by using an analysis equation for coupling capacity and two-dimensional electromagnetic field analysis. Since this constant has a value with respect to the positions of the control cable 111 and the bus bars 105, the relation among C, h, and w can be taken as a database for a mount structure.

Similarly, also for inductive coupling between the substrate 103 and the ground board and conductive coupling between the substrate 103 and the casing 101, databases corresponding to the dimensions of the respective structures can be created.

By using this circuit constant database to perform circuit analysis, EMC can be analyzed.

<Input Interface of EMC Designing Apparatus>

Figure 10:
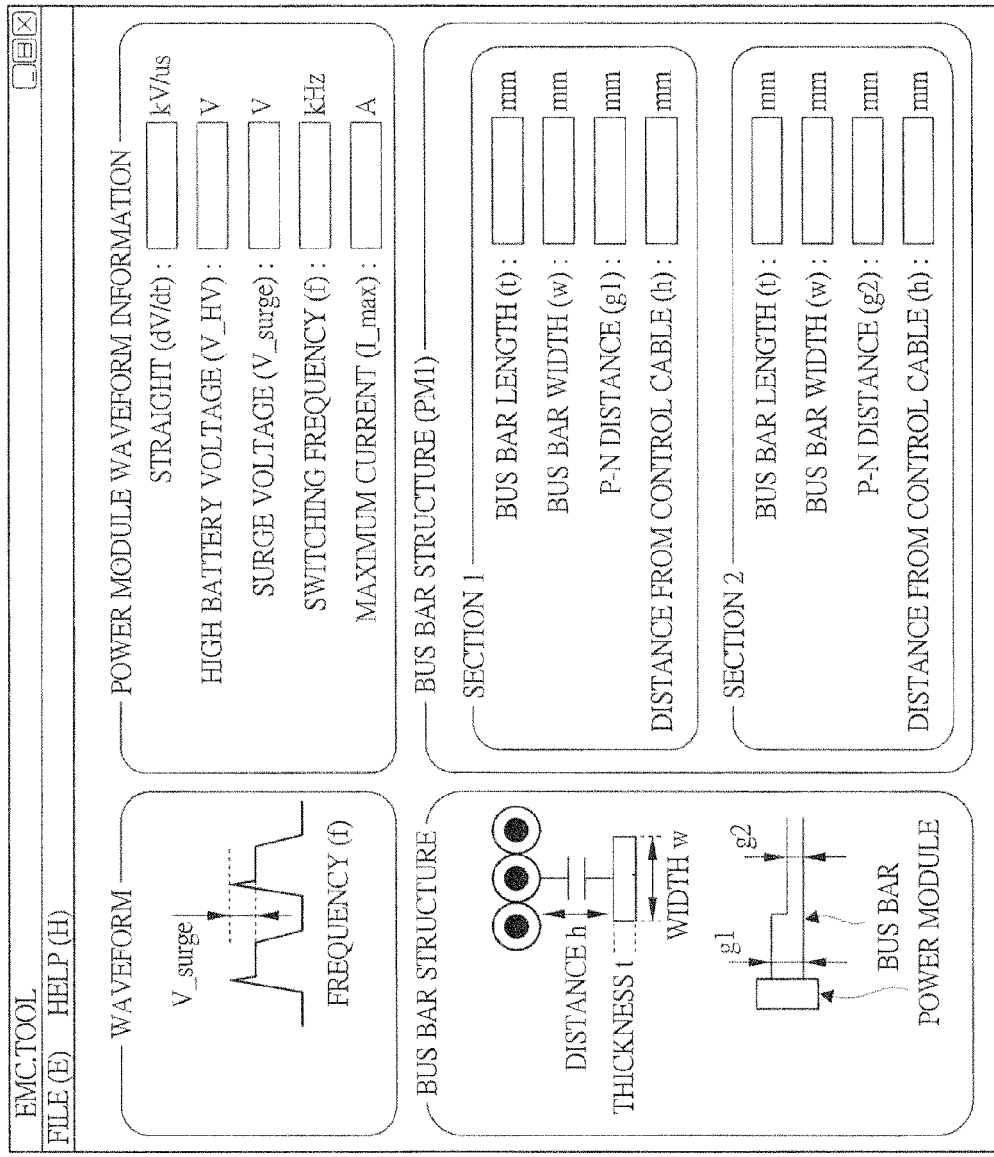
FIG. 10 is a diagram for describing an input interface of an EMC designing apparatus in the embodiment of the present invention.

FIG. 10 is a diagram for describing an input interface of an EMC designing apparatus in the present embodiment.

As described above, a template of equivalent circuit for the noise propagation path of the product is created, and a circuit constant database is created. Thereafter, by inputting dimensional information in the mountable range, a circuit constant can be automatically cited, an equivalent circuit can be created, circuit analysis can be performed, and an electric field intensity of radiated noise as an output display can be computed.

An input interface of this EMC designing apparatus includes an input screen as depicted in FIG. 10. For example, a noise source information input portion in which noise source information is input by a user includes input items each as power module waveform information, such as through rate, high battery voltage, surge voltage, switching frequency, and maximum current. A structure dimension input portion (propagation path and radiation part) in which dimensions of the structure are input includes input items each as a bus bar structure (a power module PM1), such as bus bar length, bus bar width, P-N distance, and distance from control cable, for each of a section 1 and a section 2.

From such an input screen, rising and falling times of a noise waveform, a maximum current value, information about dimensional restriction of the control cable and the bus bars, and other are input. By using this input interface, an electric field intensity of EMC can be calculated at a high speed on the order of several minutes per structure.

<Effect>

As it has been described above, according to the present embodiment, by finding, based on the major route of propagation of electric energy defined by the user, a radiation electric field by circuit analysis to classify the parts of the product into four elements in E=SPA, developing a template of equivalent circuit according to the classification, creating a circuit constant database depending on the input shape, and computing a radiation electric field by using the input shape, EMC analysis can be performed in a short period of time.

Furthermore, when thermal analysis and vibration analysis are performed in addition to EMC analysis, the same structure can be applied, and therefore an effect of eliminating the need of a new input can be achieved.

As a result, a simulation technology of ending multiphysics analysis on heat, vibration and EMC within a practical time and with a low-price computation process at an early stage of product designing can be provided.

While the invention made by the inventors of the present invention has been concretely described based on the embodiments in the foregoing, it is needless to say that the present invention is not limited to the foregoing embodiments and various modifications and alterations can be made within the scope of the present invention.

INDUSTRIAL APPLICABILITY

The present invention relates to noise analysis designing technology for electric devices and, in particular, to technology effectively applied to an EMC noise analysis designing method for inverters for automobile.

EXPLANATION OF REFERENCES

100 . . . inverter, 101 . . . casing, 102 . . . LSI, 103 . . . substrate, 104 . . . power module, 105 . . . bus bar, 110 . . . motor cable, 111 . . . control cable, 112, 113 . . . opening, 150 . . . battery, 160 . . . tire, 170 . . . motor, 180 . . . ECU, 201 . . . capacitor, 202 . . . inductor, 203 . . . resistor.

The invention claimed is:
1. A noise analysis designing method for an electric device, the method comprising the steps of:

dividing a major path of specified electric energy in the electric device into parts;

classifying each of the parts into elements;

creating an equivalent circuit of each of the parts based on the classifications of each of the parts;

creating a template of an equivalent circuit of the electric device by combining the equivalent circuits of each of the parts, creating a circuit constant database by calculating circuit constants of the equivalent circuits of each of the parts and a circuit constant of the template of the equivalent circuit of the electric device; and calculating an electric field intensity of radiated noise based on input information of the electric device and the circuit constant database, wherein the steps are performed by a processor.

2. The noise analysis designing method according to claim 1, wherein the elements include a noise source, a propagation path, and an antenna.

* * * * *